United States Patent [19]

Chang et al.

[11] Patent Number: 5,448,565
[45] Date of Patent: Sep. 5, 1995

[54] MULTIPORT LAN BRIDGE

[75] Inventors: Paul Chang, Peekskill, N.Y.; Joseph W. Coates, ; Edward H. C. Ku, both of Cary, N.C.; Simin H. Sanaye, Raleigh, N.C.

[73] Assignee: International Business Machines Corp., Armonk, N.Y.

[21] Appl. No.: 975,236

[22] Filed: Nov. 12, 1992

[51] Int. Cl.6 .................................... H04L 12/46
[52] U.S. Cl. ........................... 370/85.13; 370/85.9; 370/93; 340/825.52
[58] Field of Search ............ 370/85.1, 85.2, 85.9, 370/85.11, 85.13, 85.14, 92, 94.1, 94.3; 340/825.52

[56] References Cited

U.S. PATENT DOCUMENTS

| | | | |
|---|---|---|---|
| 4,669,079 | 5/1987 | Blum | 370/85.11 |
| 5,136,580 | 8/1992 | Videlock et al. | 370/85.13 |
| 5,210,748 | 5/1993 | Ohishi et al. | 370/85.13 |
| 5,245,606 | 9/1993 | Desouza | 370/85.13 |

FOREIGN PATENT DOCUMENTS 9016026 12/1990 WIPO .
9116679 10/1991 WIPO .

OTHER PUBLICATIONS

Electronic Design, vol. 38, No. 8, Apr. 26, 1990, pp. 75–90.

Primary Examiner—Hassan Kizou
Attorney, Agent, or Firm—Joscelyn G. Cockburn

[57] ABSTRACT

A multiport bridge includes a plurality of Bridge Port Frame Handler (BPFH) units coupled through a Source Routing bus and a Transparent Bridge Bus to a microcontroller, a Packet Memory and a Transparent Bridge Control Management System (TBCMS). Each Bridge Port Frame Handler unit receives Frames from its attached LAN, forwards selected portions of Source Routing Frames to other Bridge Port Frame Handler Units for further processing. Likewise, selected portions of Transparent Bridge Frames are forwarded to the TBCMS whereat routing information and signature information is extracted and returned to the forwarding BPFH unit for further processing.

22 Claims, 8 Drawing Sheets

| A | BPH - TB BUS ACTIVITIES | TBCM ACTIVITIES | TBCM - CAM | TBCM - SRAM1 | TBCM - SRAM2 |
|---|---|---|---|---|---|
| 1 | TB REQUEST | TB ARBITRATION | | | |
| 2 | | TB GRANT | | | |
| 3 | SEND DA | | DA TO CAM | | |
| 4 | SEND DA | | DA TO CAM | | |
| 5 | SEND DA | | DA TO CAM | | |
| 6 | | | DA/CAM MATCH | | |
| 7 | | | READ CAM MATCH | | |
| 8 | | LATCH SRAM1 RP | | READ SRAM1 RP | |
| 9 | | SEND RP TO BPH | | | |
| 2' | READ RP/ -TB REQUEST | TB GRANT TO NEXT BPH | | | |

FIG. 9

| A' | BPH / TB BUS ACTIVITIES | TBCM ACTIVITIES | TBCM - CAM | TBCM - SRAM1 | TBCM - SRAM2 |
|---|---|---|---|---|---|
| 1 | TB REQUEST | TB ARBITRATION | | | |
| 2 | | TB GRANT | | | |
| 3 | SEND SA/FRAME FORMAT | BUFFER SA(1) | SA TO CAM | | |
| 4 | SEND SA/FRAME FORMAT | BUFFER SA(2) | SA TO CAM | | |
| 5 | SEND SA/FF TAGS | BUF SA(3) + PORT ID | SA TO CAM SA/CAM MATCH | | |
| 6 | -TB REQUEST | | SA/CAM MATCH | | |
| 7 | | | READ CAM MATCH | | |
| 8 | | | | READ SRAM1 TABLE MGMT | |
| 9 | | | | SET TS IF MATCH | |
| 10 | | | | | SAVE SA 1 |
| 11 | | | | | SAVE SA 2 |
| 12 | | | | | SAVE SA 3 |
| | | | | | SAVE PORT ID |

MULTIPORT LAN BRIDGE

CROSS-REFERENCE TO RELATED PATENT APPLICATION

The patent application Ser. No. 07/658,945, filed Feb. 21, 1991, entitled "Source Routing Transparent Bridge," U.S. Pat. No. 5,280,480, and commonly assigned describes a MAC bridge for handling either source routing information or transparent bridge information.

1. Field of the Invention

The present invention relates to communications network in general and in particular to devices for interconnecting local area networks (LAN).

2. Prior Art

The proliferation of LANs creates a need for devices which interconnect the LANs so that a data terminal equipment (DTE) on one LAN can communicate with DTEs on other LANs. The conventional LAN includes a transmission medium interconnecting a plurality of DTEs. For maximum efficiency, each LAN has a maximum number of DTEs which it can support. If the DTEs exceed the maximum number, the efficiency of the LAN goes down. Depending on the use and/or configuration of the LAN, there may be instances when the number of active DTEs on a LAN are maintained below the maximum number in order to maintain a certain level of performance.

To address the limitation requirements, it is known in the prior art to provide independent or separate LANs and interconnect them by interconnecting devices. The interconnecting devices are referred to by a variety of different names including bridges, gateway, router, etc. The interconnected LANs form a unified or combined network in which DTEs on one LAN may communicate with DTEs on other LANs via the interconnecting devices.

To a certain extent, LANs are somewhat like people, in that they come in a variety of different characteristics. The variety of different characteristics adversely affects the ease with which LANs are interconnected. The interconnecting devices have to compensate for the differing characteristics in individual LANs and provide a mechanism over which dissimilar LANs can communicate.

To better understand the difficulties which have to be surmounted in order to provide an efficient interconnecting device, some of the different LAN characteristics will now be described. Included in the different characteristics which have to be addressed in order to provide an effective interconnecting device are the type of transmission media and the types of DTEs forming the LAN. The transmission media may be copper wire, fiber optics, etc. Also, the DTEs may include work stations, PCs, file servers, etc. The LANs can be implemented using different topologies, operating at different speeds, with different formats and different protocols. The topologies usually define the LAN type whereas the format and protocols define the requirements under which a DTE gains access to the network. The speed of the LAN defines the rate at which data is transmitted on the network. For example, some of the typical LAN types include star or ring networks, busses, etc. Likewise, some of the typical LAN protocols include IEEE 802.3 CSMA/CD, IEEE 802.4 Token-Passing Bus, IEEE 802.5 Token Ring, ANSI X3T9.5 Fiber Distribution Data Interface (FDDI), etc. . Finally, typical network speeds are in the range of from 4M bits/sec to well over 100M bits/sec.

Another variable affecting the interconnectivity of LANs is the interconnecting architecture (hereinafter called bridging architecture) which is used to allow passing of a frame from one LAN to another LAN. The bridging architecture is usually used by the interconnecting device. The prior art provides two types of bridging architecture which can be used to interconnect LANs. The two architectures are "Source Routing" and "Transparent Bridging". Both prior art architectures and related protocols are fully described in the literature to be identified hereafter. Therefore, only a short description of each of the two architectures will be given here in order to identify the environment in which applicants' invention is used.

In the "Source Routing" architecture and related protocols, the specific route which a frame must traverse between one end station called the "Source" and another end station called the "Destination" is carried in the frame. Prior to issuing the frame with routing information, the "source station" issues an "explorer frame" which is propagated throughout the network to the destination station. As the explorer frame traverses the network, the bridge enters routing information such as bridge identification number, LAN number, etc. On arriving on the destination LAN, the explorer frame is copied by the destination station and is rerouted via the specific route to the origination station which stores the route information and uses it to send subsequent messages to the destination station. A more detailed description of the source routing architecture and protocol is set forth in various IEEE 802.1 and IEEE 802.5 draft standards for MAC bridges and Token Ring LANs and in an article entitled, "Table-Free Bridging" by Daniel Pitt and Jacalyn L. Winkler, (IEEE Journal on Selected Areas in Communication, Vol. SAC-5, No. 9, December, 1987, pp. 1454–1462).

In the transparent bridging architecture and related protocols, the routing information is not carried in the frame. Instead, the source and destination addresses in each frame and address tables in the interconnecting bridge are used to forward the frame from one LAN to another. In particular, the addresses of stations which are connected to respective bridged LANs are recorded and maintained in separate tables which are generated in the interconnecting bridge. When a source station on a first LAN wishes to communicate with a destination station located on another LAN, the destination address of the destination station is included in the frame. The interconnection bridge, on receiving the frame, compares the destination address with address entries in the address table which is associated with the first LAN. If a match is not made and the bridge is in a "forwarding state", the frame is forwarded to the other LAN. A more detailed description of the transparent bridge architecture and related protocols are set forth in International Standard ISO 10038 (IEEE Draft Standard P802.1d/D9).

For a variety of reasons, most if not all LAN users have a plurality of different LANs which have to be interconnected to and from the unified network. Due to the above described differences, the LANs may be viewed as non-homogeneous or heterogeneous networks. The challenge which the system integrator faces, in interconnecting these LANs, is to provide an interconnecting device which is able to satisfy the unique characteristics of the heterogeneous LANs and, at the same time, provide optimum services.

It is well-known in the prior art to use an interconnecting device such as bridges or the like to interconnect discrete LANs. The prior art interconnecting devices are described in the following U.S. Pat. Nos. 4,597,078, 4,627,052, 4,707,827, 4,737,953, 4,933,938 and 4,996,524. Generally, the prior art interconnecting devices are store and forward devices. The devices are provided with look-up tables in which the addresses for DTEs are stored. Depending on the philosophy of the design, the address in an incoming frame is compared with the contents of the look-up table and is either discarded or forwarded to another LAN. Even though there may be variations in the design of a particular patent, the broad store and forward approach is the underpinning for the prior art designs.

Even though the prior art interconnecting devices work well for their intended purposes, they do not possess the versatility to connect LANs with a wide variety of different characteristics. For example, the prior art interconnecting devices interconnect LANs which use the same type of transmission medium. Thus, a LAN using a wire transmission medium would be connected to another LAN which also uses wire transmission media.

Another area of deficiency in the prior art bridging devices is that DTEs using the source routing (SR) bridging architecture and those using the transparent bridging (TB) architecture are not connected in an efficient manner. As is exemplified by the cited patents, the interconnecting devices connect DTEs using the TB architecture or, as is exemplified in the above article by Daniel Pitt and Jacalyn L. Winklet, the interconnecting devices connect DTEs using SR architecture.

Still another area of deficiency in the prior art interconnecting devices is that there is no translation function so that LANs with different protocols can be connected and communicate. Instead, only LANs using the same protocols can be connected. Thus, a LAN using the token ring protocol can only be connected to other LANs using the same protocol or one using ethernet may only be connected to others using the same protocol and so forth.

Finally, the prior art interconnecting devices provide limited connectivity. Usually, only two LANs are connected via the same interconnecting device.

We believe that the above deficiencies place unnecessary restrictions which adversely affect the interconnectability of LANs.

SUMMARY OF THE PRESENT INVENTION

It is a main object of the present invention to provide an interconnecting device which is more efficient than has heretofore been possible.

It is another object of the present invention to provide improved interconnecting devices which link heterogeneous LANs.

It is still another object of the present invention to provide an interconnecting device which links DTEs using both source routing (SR) and transparent bridging (TB) architectures.

The above and other objects are achieved by providing a heterogeneous multiport bridge which performs frame filtering, copying, forwarding and header conversion in a relatively short time interval.

In particular, the multiport bridge includes at least one LAN controller interconnected by a medium access device to a LAN. The LAN controller, in turn, is connected through a Bridge Port Frame Handler to a first high speed bus, called system control/address/data bus. Other units including a packet memory and a microprocessor are also interconnected to the bus.

The LAN controller and medium access device are responsible for receiving and transmitting information frames from and onto the LAN. The bridge port frame handler, among other things, does the frame filtering, copying and forwarding decisions for every frame it receives. If required, the bridge port frame handler also modifies the frame and relays it to the proper bridge port for retransmission. The packet memory temporarily stores frames which await additional services (such as retransmission or additional services from the microprocessor). The microprocessor performs bridge management functions and handles frames requested by the bridge port handler.

A second high speed bus, called a transparent bridge (TB) bus interconnects the bridge port frame handler, the microprocessor and a transparent bridge control and management (TBCM) unit. At least one isolator (ISO) device interconnects the at least one bridge port frame handler to the TB bus. The TBCM unit assists the bridge port frame handler to quickly identify the port to which transparent bridge frames are to be routed. As a result, bridging functions such as frame filtering, copying, forwarding, header conversion and other decision making are done faster than has heretofore been possible.

More particularly, the TBCM unit is coupled to a content addressable memory (CAM) and an SRAM. The workstation addresses are stored in the CAM. The routing parameters and signature information (such as, origination port ID, frame format, etc.) and bridge management status tags are stored in the SRAM. The microprocessor is responsible for enabling and disabling the TBCM, updating and maintaining the data bank (CAM and SRAM) table contents The bridge port handler forwards, on the TB bus, to the TBCM destination addresses (DA), source addresses (SA) and optional frame format tag of received frames, The TBCM processes received information and returns to the bridge port handler results (such as target port ID, target port frame format, etc.), on the TB bus.

The foregoing features and advantages of the invention will be more fully described in the accompanying drawings.

DETAILED DESCRIPTION OF THE PREFERRED EMBODIMENT

Figure 1:
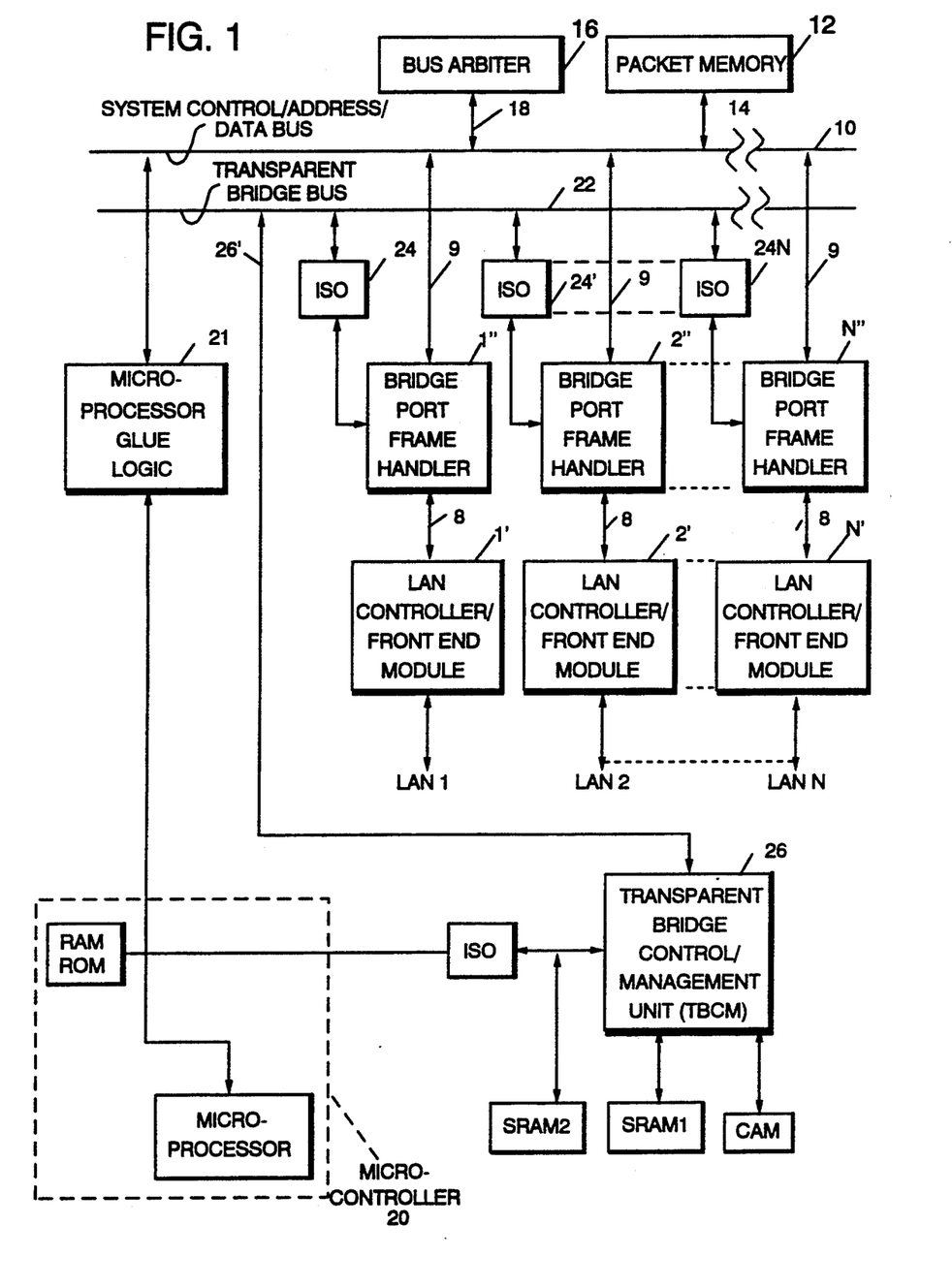
FIG. 1 shows a block diagram of the interconnecting device according to the teachings of the present invention.

FIG. 1 shows a functional system diagram of a device which interconnects local area networks such as LAN 1, LAN 2 ... LAN n. The LANs may be homogeneous formed from a plurality of similar networks taken from any of the network types such as token ring, ethernet, token bus, fiber distribution data interface (FDDI), etc. The interconnecting device can be used to interconnect heterogeneous or a mixture of different LANs. In this regard, one or more of the LANs could be of one type while other LANs are other types. In addition, the interconnecting device can interconnect LANs which utilize different protocols. Each of the LANs are connected through LA Controller/Front End Module 1', 2'. . . n'. The LAN controller/front end modules are connected through transmit media 8 to Bridge Port Frame Handlers 1", 2". . . n". The bridge port frame handlers 1", 2". . . n" are connected through transmission media 9 to a high speed System Control/Address-/Data Bus 10. Packet memory means 12 is connected through transmission media 14 to Bus 10. Likewise, Bus Arbiter 16 is connected through transmission media 18 to High Speed Bus 10. As is evident from the structure, LAN 1 is connected through LAN Controller/Front End Module 1', transmission media 8, Bridge Port Frame Handler 1" and transmission media 9 to high speed bus 10. Similarly, LAN 2 is coupled through like components to high speed bus 10 and so forth.

Still referring to FIG. 1, a microcontroller 20 is coupled through microprocessor glue logic 21 to High Speed bus 10. The microcontroller 20 includes a microprocessor and interconnected RAM/ROM. The function of the microcontroller is to manage the interconnecting devices Transparent Bridge Bus 22 is coupled through independent isolation (ISO) circuit means 24, 24'. . . 24n to respective ones of the bridge port frame handlers. Transparent Bridge Control/Management unit (TBCM) 26 is connected through appropriate transmission media 26' to Transparent Bridge Bus 22. The TBCM 26 is coupled through appropriate transmission media to SRAM 2, SRAM 1 and contents address memory (CAM). As will be described in greater detail hereinafter, the function of TBCM 26 and its attached SRAM 2, SRAM 1 and CAM is to identify Bridge Port Frame Handler to which a Transparent BridgeFrame (to be described hereinafter) is to be forwarded. The identified Bridge Port Frame Handler in turn routes the frame to the destination station on the LAN which it supports.

Before discussing the details of each of the above identified functional units, it is worthwhile giving a short summary of the type of frames that are usually transmitted through a bridging device. Broadly speaking, the frames are classified as a Source Routing Frame and a Transparent Bridge Frame. In a Source Routing Frame, the path that the frame travels in going from an origination station to a destination station, each of which are located on different LANs, are set forth in the frame. In a Transparent Bridge Frame, there is no routing information in the frame. Therefore, the interconnecting device has to determine the route along which the frame must travel from the origination station to the destination station. A more detailed description of the source routing and transparent bridging frames is set forth in the above-identified Pitt et al article.

Figure 5:
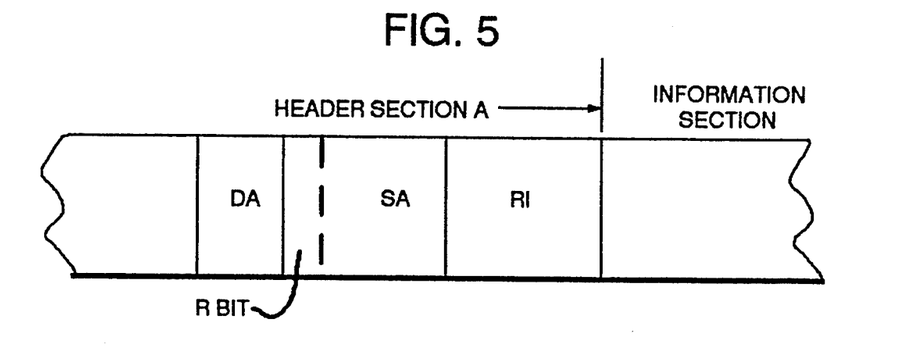
FIG. 5 shows a partial general frame format.

Turning now to FIG. 5, a partial representation of a general frame format used to transport data within the interconnected network is shown. The frame format includes a header section A and information section B. Among the information which is carried in the header section is the routing information which is used to shuttle Source Routing Frames through the network. The information section, in turn, carries among other things, the data which one station wants to forward to another station. Other fields such as CRC, end delimiter, ect., follow the informational section also known as information field. It should be noted that detailed fields in each of the frame formats depend on the type of local area network. For example, a token ring LAN has a different frame format from an ethernet LAN, a FDDI LAN and so forth.

Notwithstanding the differences, the header section includes a destination address (DA) field and a source address (SA) field. It also includes a control source routing (SR) bit "R" which can be set by the originating station as a "1" or a "0". Usually when set as a 1, the frame is a Source Routing Frame. As described above, a Source Routing Frame carries a RI (routing information) field in which the route that the frame follows through the network is provided in the RI field. When the SR bit is set to a "0", this indicates a Transparent Bridge Frame and the route port of the frame has to be generated in the interconnecting device. The key to the interconnecting device of the present invention is the speed with which it allows a station on one of the attached LANs to communicate with other stations on other LANs. This requires efficient frame filtering, copying, forwarding and header conversion.

Referring again to FIG. 1, each LAN Controller/-Front End Module and its attached Bridge Port Frame Handler can be viewed as a port (entry point) into the interconnecting device. With this characterization, the interconnecting device of the present invention can be construed as a multiport interconnecting device. The LAN Controller/Front End Module receives and transmits data frames from and onto the medium constituting the LAN to which it is connected. Each Bridge Port Frame Handler performs the frame filtering, copying and forwarding decision for every frame received, modifies the frame, if necessary, and relays the frame to the proper bridge port for retransmission. The-packet memory 12 stores the frames which await for the next services (retransmission or additional services from microcontroller 20). As stated previously, the microcontroller provides interconnecting or bridge management functions as well as handling frames requested by the Bridge Port Handler units. Having described the overall structure of the interconnecting device, the detailed description of selected functional units will now be described.

Figure 2:
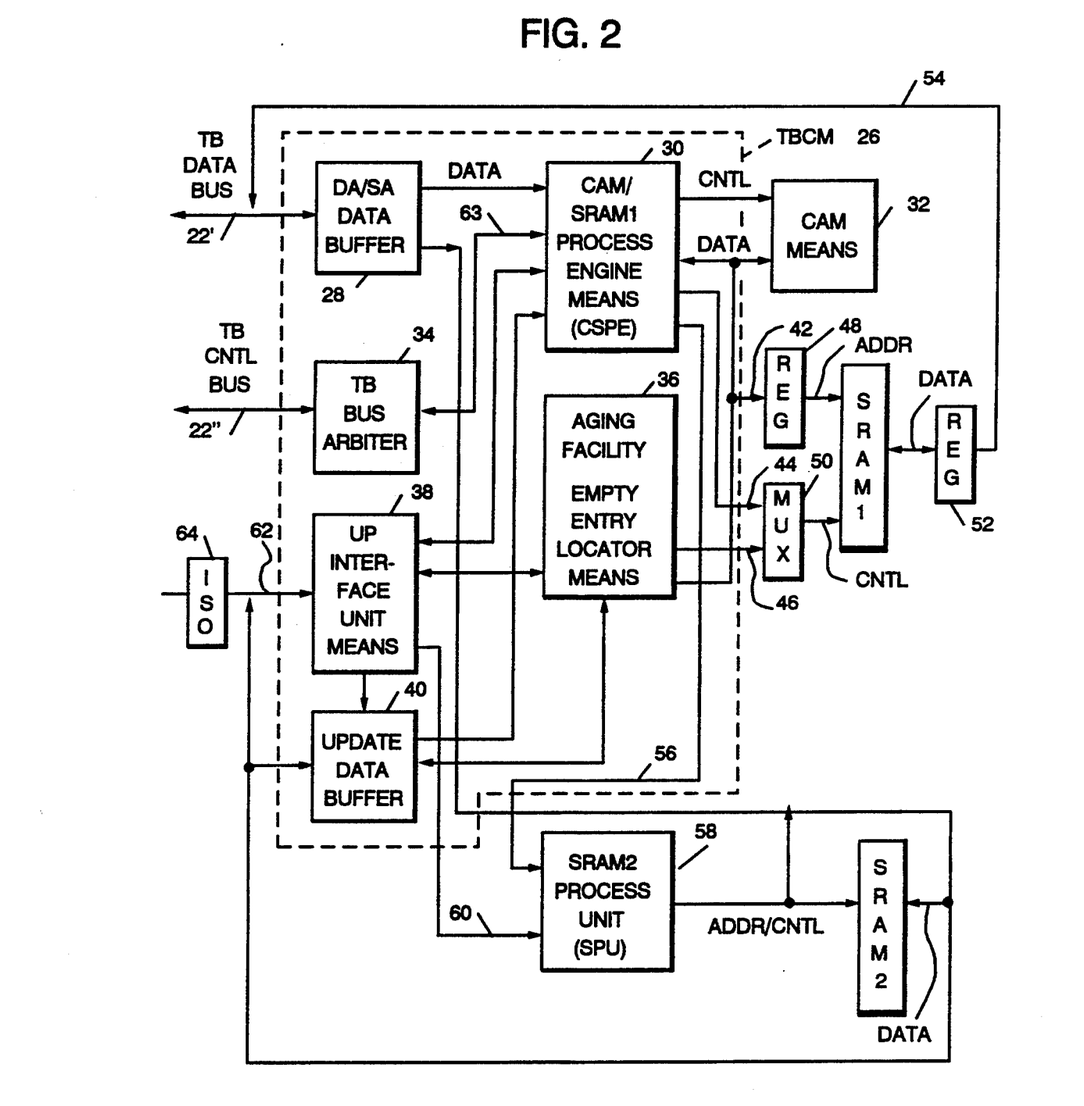
FIG. 2 shows a detailed block diagram of the transparent bridge control/management (TBCM) unit.

FIG. 2 shows a block diagram for the transparent bridge control/management (TBCM) unit and its attached SRAM 2, SRAM 1 and CAM. The TBCM 26, SRAM 2, SRAM 1 and CAM cooperate with the Bridge Port Frame Handlers to provide the bridging device with high speed (rapid) frame filtering, copying, forwarding and header conversion decision making.

The TBCM includes DA/SA Data Buffer 28, CAM/SRAM 1 Process Engine (CSPE) Means 30, Contents Address Memory (CAM) means 32, transparent bridge (TB) bus arbiter 34, Aging Facility/Empty Entry Locator Means 36, Microprocessor Interface means 38 and Update Data Buffer 40. One set of outputs from TBCM 26 is fed over conductors 42, 44 and 46 to register (REG) 48 and MUX 50. The output from REG 48 forms an address bus into SRAM 1. Similarly, the output from MUX 50 form control signals and are transmitted over conductor labeled CNTL into SRAM 1. The output from SRAM 1 is fed over a data bus into register (REG) 52. The output from register 52 is fed over data bus 54 to TB data bus 22". It should be noted that transparent bridge (TB) bridge bus 22 includes TB control bus 22" and TB data bus 22'.

Another set of outputs from TBCM 26 is fed over conductor 56 to SRAM 2 Process Unit (SPU) 58 and over conductor 60 to SRAM 2 Process Unit 58. The output from SRAM 2 Process Unit 58 is fed over Address Control lines to SRAM 2. The internal interconnections between the functional units are made by appropriate transmission media as shown in the figure. For brevity, a detailed description of each of the interconnecting lines is omitted. The TBCM 26 is coupled to microcontroller 20 by microprocessor interface means 38 and bus 62. Isolator circuit 64 provides isolation function between microcontroller 20 and the TBCM 26. The ISO 64 is a conventional off-the-shelf isolator circuit module which can be set in a high state to isolate the TBCM 26, by signals from the microprocessor. Having described the functional units of TBCM 26, the function which each unit performs will now be described.

Still referring to FIG. 2, the DA/SA Data Buffer 28 is used to temporarily store the DA and the SA during each DA/SA address matching process (to be described hereinafter). If the incoming source address (SA) is "new" (i.e., no CAM matches) the incoming SA data, at the end of the SA process, stored in the DA/SA buffer is transferred to SRAM 2.

The TB bus arbiter 34 arbitrates the TB bus request from the attached Bridge Port Frame Handler (BPFH) ports. The ports can be arranged with different priority status and will be serviced by the TB bus arbiter 34 according to their status and the order in which the request is made over TB control bus 22". A First-In First-Out (FIFO) buffer is used in the TB bus arbiter 34 to track the non-priority ports request sequences. The TB bus arbiter 34 communicates over transmission media 63 with the CAM/SAM 1 Process Engine Means 30. The TB bus arbiter 34 also issues the TB grant to the appropriate BPFH port, requesting use of the TB bus.

The CSPE 30, CAM means 32, SRAM 1, registers 48 and 52 and MUX 50 form a central data bank means which stores source addresses of LAN stations and signature information. The signature information includes bridge port IDs, control information, etc. Source addresses for stations on respective LANs are stored in the CAM means 32. Likewise, the SRAM 1 holds the routing parameters or signature information, such as target BPFH port, QID, accepted frame format, etc. for stations on the LANS. The CAM/SRAM processing engine 30 is an execution unit which carries out the DA/SA matching process against data bank entries in the CAM. For each DA match, the engine reads matched entry location in CAM and uses the same CAM address to access the SRAM 1 to read out the signature information which is associated with the DA address. For example, if a matched address was found at CAM location 283, the same location address 283 would be used to access SRAM 1. The information found in SRAM 1 at location 283 would be the matching signature information for the DA address extracted from location 283 in the CAM means. Once the signature information is extracted from the SRAM 1, it is fed into register 52, over bus 54 to bus 22 and to the Bridge Port Frame Handler port which requests the information.

For any SA match, the CSPE 30 reads the match location in CAM and reads the paired SRAM 1 data, sets the time stamp bit (to be described subsequently) and writes back into the same SRAM 1 location. For match SA, the serviced BPFH ID must match the port ID in the SRAM 1. Otherwise, the matched entry will be removed from the data bank immediately and the processed SA will be treated as a no match SA. If no SA match occurs, the CSPE 30 tells SRAM 2 Process Unit 58 to move the SA data in the DA/SA buffer and its BPFH port ID into SRAM 2 "new SA" FIFO buffer for the microprocessor to process at a later time. The CAM/SRAM 1 Process Engine 30 in addition to performing the matching function and extracting signature information which is forwarded to the requesting bridge port, is also responsible for executing the data bank entry update and removal processes.

Figures 3A, 3B:
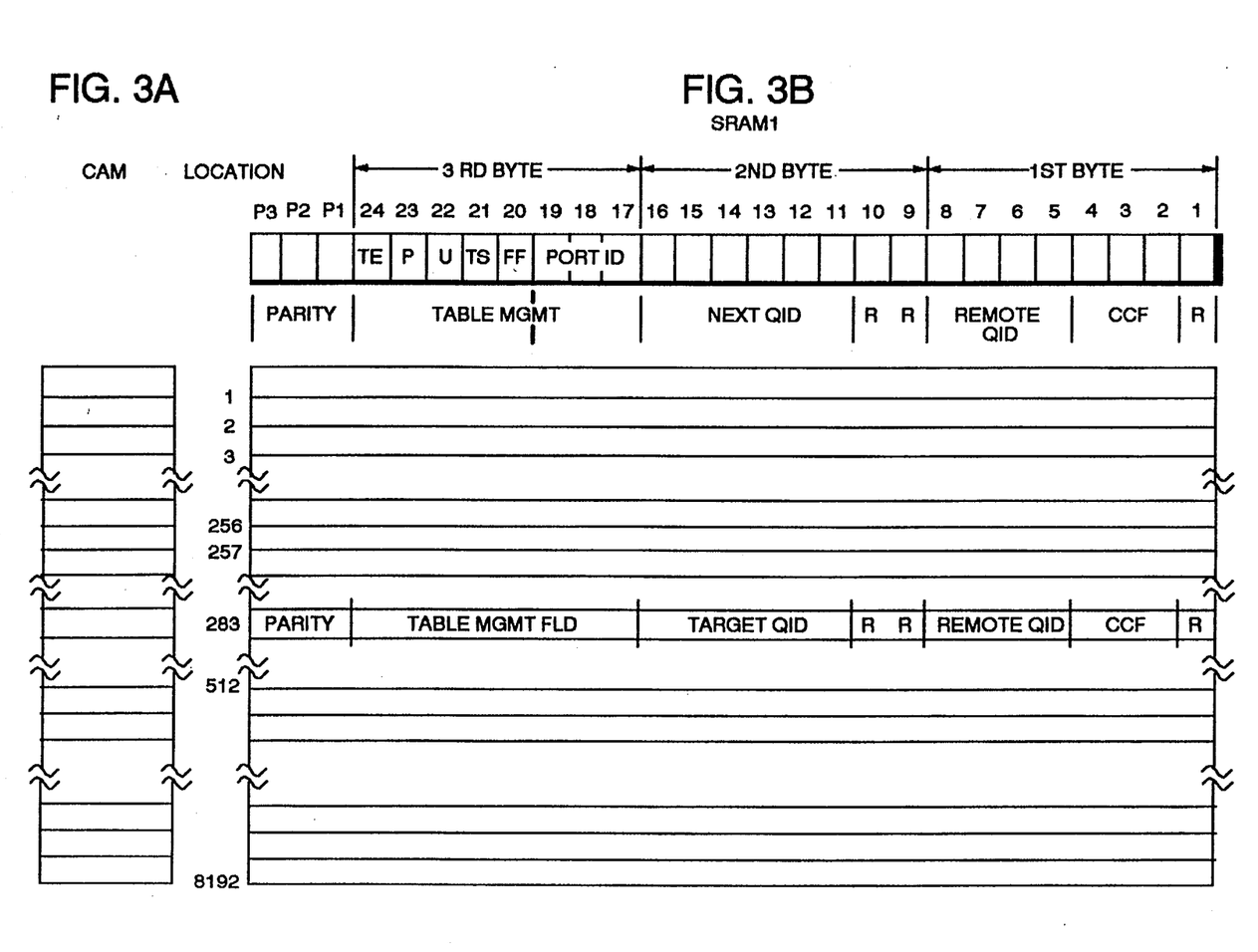
FIG. 3A shows a graphical representation of the contents address memory (CAM).
FIG. 3B shows a graphical representation of the SRAM 1 which stores signature information on the bridge port frame handler (BPFH).

Turning to FIG. 3B for the moment, a graphical representation of the CAM and SRAM 1 structures are shown. The CAM is a self-contained off-the-shelf module which accepts an address, simultaneously compares it against a plurality of addresses and outputs a signal indicating the location in the CAM where a matched address resides. Suitable off-the-shelf CAMs include AM99C10A marketed by Advanced Micro Devices.

In FIG. 3B, the column labelled LOCATION indicates CAM addresses and SRAM 1 addresses. Therefore, the CAM can be addressed from location or address 1 through 8192. The CAM is used for storing stations' addresses and is six bytes wide. This means a station with six bytes of address can be stored in each CAM location. Of course, different size adresses can be used without departing from the scope or teachings of the present invention.

The SRAM 1 is 27 bits wide and has addressable location like the CAM. The relationship between the CAM and SRAM 1 is such that the address and signature information relating to that address are stored in like locations of the CAM and SRAM 1. For example, the signature information that is stored in location 256 of SRAM 1 is for the address which is stored in location 256 of the CAM. By using a common address for storing a station address and its related signature information, a single location address can be used to access the CAM and SRAM 1. The SRAM 1 bits includes a parity field, Table Management (TABLE MGMT) field including Port-ID, Next QID field, R reserved bits, remote QID field, and CCF field. The parity field stores a parity bit for each byte of data in the SRAM 1. The table management field stores management information relative to information stored in the table. The next QID or target QID stores information representative of the target or direct device.

The Port-ID field stored information representative of which port the source address is from. The R bits are reserved bits for future use. The remote QID stores information representative of in-direct target QID. The CCF field stores frame conversion information. The following Table 1 identifies and describes the SRAM1 bits. As is evident from the Table 1 and FIG. 3B, SRAM1 is twenty-seven bits wide, including twenty-four data bits and three parity bits.

TABLE 1

| BIT # | DESCRIPTIONS |
|---|---|
| 24: | Frame format test enable (TE) |
|  | 0 = disable frame format test |
|  | 1 = enable frame format test |
| 23: | Protected entry |
| 22: | Entry in use |
| 21: | Time-Stamp tag |
| 20: | FRAME FORMAT (VALID ONLY ON ETHERNET; 0 = ETHERNET, 1 = IEEE802.3) |
| 19–17: | PORT ID |
| 16–11: | QID1 (Forwarding port QID) |
| 10, 9: | Reserved |
| 8–5: | QID2 (Remote port QID) |
| 4–2: | Frame conversion control field (CCF) |
|  | 4 3 2 |
|  | 0 0 0     No frame conversion |
|  | 0 0 1     Convert to FDDI format |
|  | 0 1 0     Convert to Token-Ring format |
|  | 0 1 1     Reserved |
|  | 1 0 0     Convert to Ethernet format |
|  | 1 0 1     Convert to IEEE 802.3 format |
|  | 1 1 0     Reserved |
|  | 1 1 1     Generic Format |
| 1: | Reserved |

With reference to Table 1, the first column, labeled Bit #, identifies respective bits within SRAM1 (FIG. 3B) and the column labeled Descriptions indicates the function which the bits provide. In particular, bit 23 is the "Protected entry" bit which indicates the table element is a permanent or static address element and that "Aging" should not apply to this element. As used in this specification, Aging is a technique which is used to delete an entry from the SRAM 1 and CAM (jointly called a look-up table). Unless entries are entered and periodically deleted from the look-up table, an oversized table would be required to store signature information for each station on the network. However, by using the aging function of the present invention, a relatively smaller size SRAM 1 is sufficient to store information about the active stations on the network. The "entry in use" bit 22 is a flag bit which reminds the microprocessor which one of the address table elements is in operation. The bit is set and reset by the microprocessor. The "time stamp tag" bit is a flag bit which is important to the address table element birth/aging process. Whenever a SA/AMmatch is detected, this flag bit (in the same address as the address here the match occurs in the CAM) is set to "1" by the TBCM to indicate hat the station is still "active". The microprocessor scans this bit of each entry periodically and decides when to delete the "age" address table element. In the alternative, if "auto aging enable" (to be described subsequently) is set, the microprocessor issues the auto aging command to TBCM which deletes the aged elements from the address table. As stated before, this deletion provides space for entering information about "New" LAN stations which are entering the network.

Still referring to Table 1, bits (19-17) identify the port which sends the source address (SA). Likewise, bits (4-2) are the frame conversion control bits. The setting of the frame conversion control bits indicates if the frame format is to be changed. For example, if the bits are all zeros, there is no frame conversion. Similarly, if the bits are 001' the frame is converted to FDDI format. The conversion is done by the Bridge Port Frame Handler which is communicating with the TBCM (FIG. 1). The functions of other bits in the table have already been described or are evident from the Table 1. This being the case, further description of the Table 1 is not warranted.

Still referring to FIG. 2, the Aging Facility and Empty Entry Locator Means 36 perform the aging function which deletes old entries from the CAM and SRAM 1 and locates empty location within the CAM and SRAM 1. Preferably the Aging Facility and Empty Entry Locator means are implemented in hardware. The aging facility hardware which could be a state machine scans the SRAM 1 Time Stamp (TS) bit, Entry in use (U) bit and Protected Entry (P) bit depending on their settings takes appropriate action. The below Table 2shows the bits which are scanned and the appropriate action taken according to the setting of the bits.

TABLE 2

| P | U | TS | ACTIONS |
|---|---|---|---|
| 1 | x | x | No action, go to next item. |
| 0 | 0 | x | No action, go to next item. |
| 0 | 1 | 0 | Ask CAM/SRAM1 process engine to empty CAM entry, Zero out SRAM1 entry, Advance Aging entry deleted counter. |
| 0 | 1 | 1 | Reset TS bit to "0", Advance Entry remained counter. |
| x | — | Don't care | |

The aging facility begins the auto aging process when the microprocessor (FIG. 1) issues a start auto aging command. The aging facility begins at the beginning (i.e., the first entry in the CAM SRAM 1) and works it way to the last entry. After the last entry is processed, the aging facility sets auto aging completed flag and interrupts the microprocessor indicating that the auto aging process is now completed.

As soon as the aging command is detected, the Empty Entry Locator, also a hardware state machine, resets the empty entry found flag. It synchronizes with the aging facility state machines and starts from the first table location. When it detects the first available empty entry location, it freezes its pointer and sets the empty entry found flag. When the empty entry found flag bit is reset, the Empty Entry Locator continues to scan table entries until it either finds another empty entry location and sets the empty entry found flag or reaches the last table entry and sets the table resource exhausted flag to inform the microprocessor of the finding. Therefore, the Empty Entry Locator locates the empty entry location for table update.

The SRAM 2 Process Unit (SPU) 58 works with the CSPE 30 (FIG. 2) to store the "New" SAs and their correlated Bridge Port Frame Handler (BPFH) port ID and its frame format into the SRAM 2. The microprocessor, at its convenience, transfers the information from SRAM 2 into the Update Data Buffer 40 (FIG. 2) from whence it is transferred into the CAM means and SR 1. As is used in this specification, new SA refers to a source address which does not find a match in the CAM means. As stated previously, if there are no SA matches in the CAM, the address with its signature information is stored in SRAM 2 and is subsequently processed by the microprocessor. The SRAM 2 Process Unit (SPU) 58 also handles the event counts, the update statistical counters which are kept in the SRAM 2.

Figure 4:
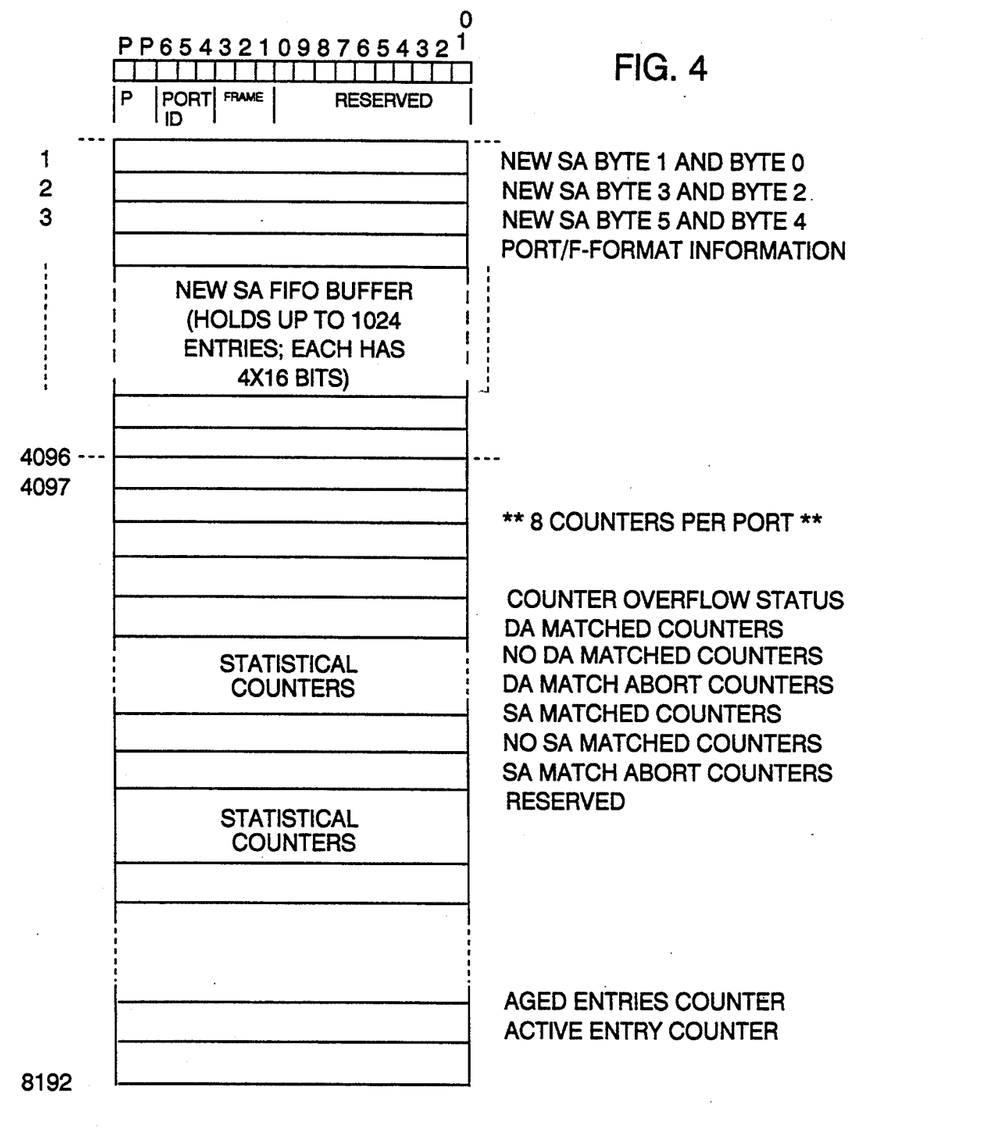
FIG. 4 shows a graphical representation of the SRAM 2 which store "new" source addresses (SA) and other information to be entered in the CAM and/or SRAM 1.

Turning to FIG. 4 for the moment, a graphical representation of SRAM 2 is shown. The SRAM 2 is a static random access memory, and in this embodiment, has 8,192 addresses shown on the left hand side of FIG. 4. As is evident from the first row in FIG. 4, the SRAM 2 is eighteen bits wide. The SRAM 2 includes an address section whose data includes a parity (P field) a port ID field (bits 16, 15 and 14), a frame format field (bits 13, 12, 11) and a reserve field (bit 10 through 1). As is evident from the right hand side, the SRAM 2 includes a plurality of counters, each one being listed to the right of the SRAM 2 buffer. It should be noted that the showing in FIG. 4 is only exemplary of the information stored in the SRAM 2 buffer and should not be used as a limitation on the scope of this invention.

Returning again to FIG. 2, the microprocessor interface unit means 38 provides communication between the microprocessor (FIG. 1) and the TBCM. To this end, the microprocessor interface means includes the microprocessor address decodes, the command, the status registers, the setup registers, etc. Details of the status registers, etc., are not shown because it is believed that such structures are well known in the prior art and is not necessary to understand or carry out the teachings of the present invention.

Still referring to FIG. 2, the Update Data buffer means 40 is a tri-section buffer having a CAM data section, an address section and a SRAM 1 data section. Its function is to store information for updating the CAM and SRAM 1. To this end, when the microprocessor wants to update and/or delete information in the CAM/SRAM 1, it first place the CAM data into the CAM data section of the Update Data Buffer, the CAM/SRAM 1 address location into the address section and the SRAM 1 and data in the SRAM 1 data register section. The microprocessor then issues the appropriate command (such as update CAM/SRAM 1 or delete CAM/SRAM 1). The CSPE 30 updates or deletes the table entry and inform the microprocessor when the process are completed.

Referring again to FIG. 1, the Bridge Port Frame Handlers are connected through individual isolation (ISO) circuitry to the transparent bridge bus 22. As stated previously, the transparent bridge bus 22 shuttles header information (SA/DA) and signature information between the TBCM and respective bridge frame handlers. The structure of the transparent bridge (TB) bus 22 is as follows:

A) 16-bit data bus which is common to all Bridge Port Frame Handlers (BPFH).

B) One request line per BPFH. The bus request line is raised when abridge Port Frame Handler wishes to use the bus. With reference to FIG. 2, permission to use the bus is granted by TB bus arbiter 34. The request line remains active until the BPFH services are completed.

C) One token bridge bus grant line per BPFH. The TBCM activates the grant line to the selected Bridge Port Frame Handler that is given permission to use the bus. The signal on the token bus grant line is used to activate the ISO circuits coupled to the Bridge Port Frame Handlers which are not granted permission to use the bus. The signal bus grant line remains active until the TBCM completes its TB service to the BPFH.

D) A DA/SA data flag tag which indicates whether the transmitted address is a data address (DA) or source address (SA) data.

E) Frame format flag tag which indicates the frame format of a SA packet.

F) Transparent bridge (TB) DA/SA data valid issued to the bridge port handler to indicate DA/SA data valid.

G) A TB result data valid for TBCM to indicate the validity of data transmitted to the Bridge Port Frame Handler.

Figure 6:
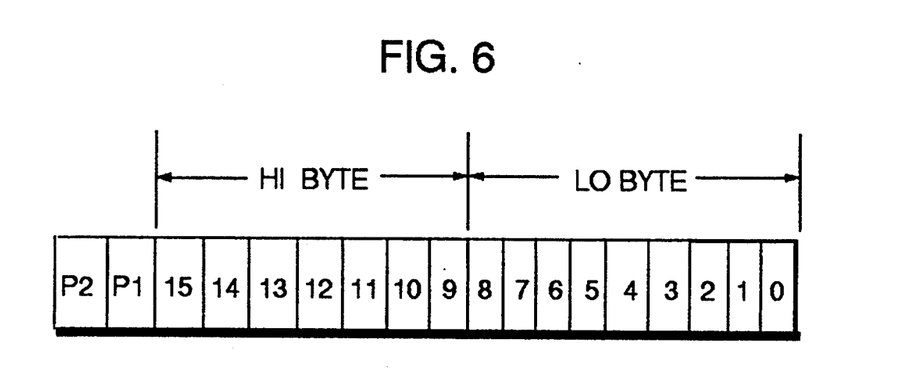
FIG. 6 is a graphical representation of data format on the transparent bridge (TB) bus.

FIG. 6 is a graphical representation of typical data format on the transparent bridge (TB) bus. The data format includes two bytes (high and low) and two parity bits. Table 3 below shows the structure of data (step A) from bridge port handler to the TBCM and the structure of data (step B) from the TBCM to the BPH when a match occurs. As was stated previously, the addresses (source address or destination address) is six bytes wide. As is evident from Table 3, bytes 0, 2 and 4 are the low bytes, while bytes 1, 3 and 5 are the high bytes. For each transmission, a high and a low byte are transmitted. Therefore, in the first transmission from BPH to the TBCM, bytes 0 and 1 are transmitted. On the second transmission, bytes 2 and 3 are transmitted and so forth. As is shown in FIG. 6, the TB Bus is two bytes wide. Therefore, three transmissions are required to transmit a DA or SA.

In step B, the TBCM writes destination match result to the BPH. The first column represents the bit numbers and the second column gives the description. The table is self-explanatory and a detailed description of each line will not be given. Suffice it to say that bits 3, 2 and 1 represent frame conversion control field. The action which the target bridge port must follow depends on the setting of the bits. For example, if all three bits are logical 0s, then no frame conversion is necessary. If bit 1 is a logical 1, bits 2 and 3 are 0s, then the target bridge port converts the frame to FDDI format before it is transmitted and so forth. It should be noted that if no DA match occurs, QID 1 is the default value.

TABLE 3

| Step A - BPH sends DA/SA data to TBCM: | | |
|---|---|---|
| | HI-BYTE | LO-BYTE |
| DA/SA | Byte 1 | Byte 0 |
| DA/SA | Byte 3 | Byte 2 |
| DA/SA | Byte 5 | Byte 4 |

| Step B - TBCM writes DA match result to BPFH: | | |
|---|---|---|
| BIT # | DESCRIPTIONS | |
| 15-10: | QID 1 (Forwarding port frame data QID) | |
| 9: | 0 = DA match found; 1 = no DA match found | |
| 8: | Reserved | |
| 7-4: | QID 2 (Remote port frame data QID) | |
| 3-1: | Frame conversion control field (CCF) | |
| | 3 2 1 | |
| | 0 0 0 | No frame conversion |
| | 0 0 1 | Convert to FDDI format |
| | 0 1 0 | Convert to Token-Ring format |
| | 0 1 1 | Reserved |
| | 1 0 0 | Convert to Ethernet format |
| | 1 0 1 | Convert to IEEE 802.3 format |
| | 1 1 0 | Reserved |
| | 1 1 1 | Generic format |
| 0: | Reserved | |

Figure 7:
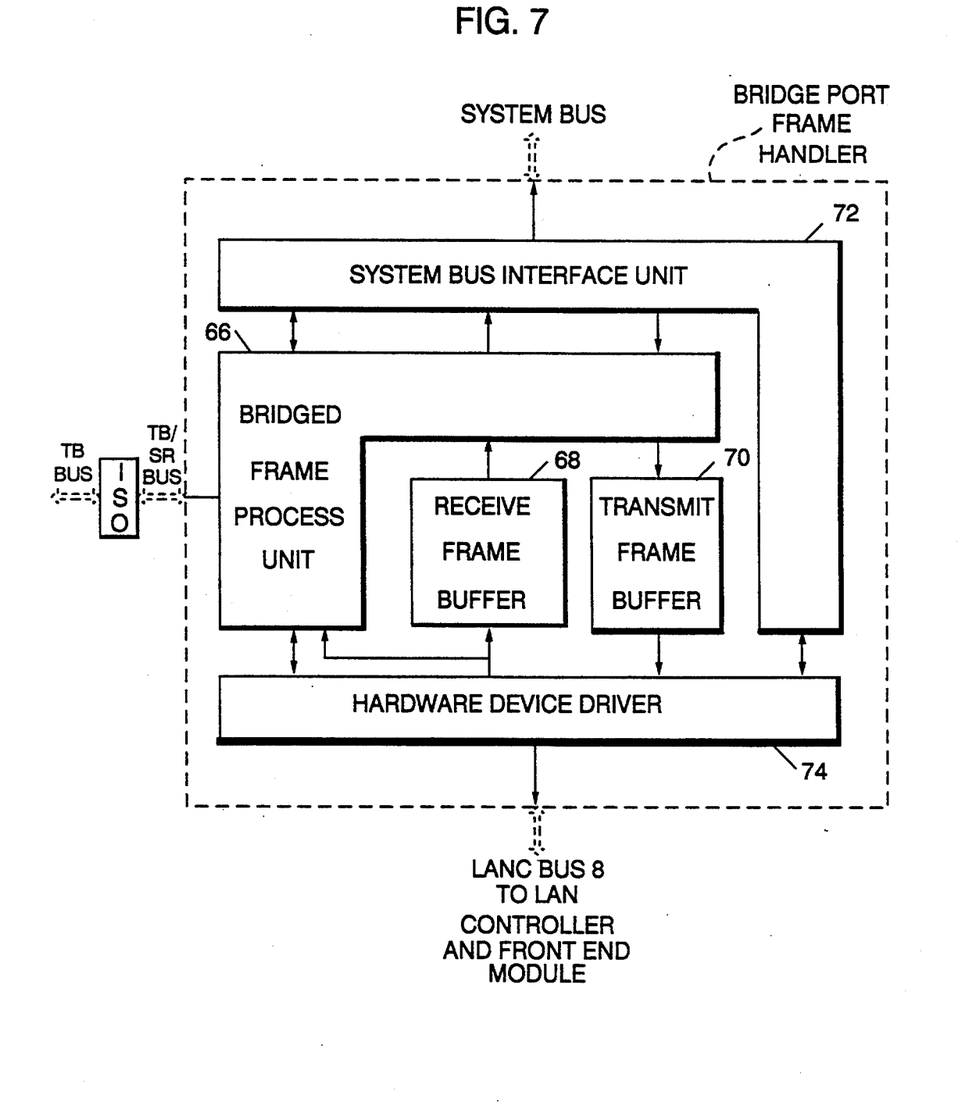
FIG. 7 shows a block diagram of the bridge port frame handler.

FIG. 7 shows a block diagram of the Bridge Port Frame Handler (BPFH) which interfaces respective LANs to the interconnecting device of the present invention. One BPFH device is required to attach each LAN to the interconnecting device. Therefore, if the interconnecting device, also known as a bridge, interconnects one LAN, one device is required. Two devices are required for two LANs, and so forth. The BPFH devices are identical. Therefore, only one will be described hereinafter with it being understood that the other devices are identical. Turning to FIG. 1 for the moment, each BPFH device is coupled to the LAN which it serves by aLAN Controller Front End Module. The LAN Controller Front End Module is LAN specific which means that the module only performs only MAC protocols specific to the LAN. For example, if the LAN Controller Front End Module attaches a token ring LAN, it performs that token ring protocol (also called IEEE 802.5). The IBM token ring network PC adapters (IBM Technical Reference #6165876) performs the token ring protocol. Other types of networks, such as token bus (IEEE 802.4), ethernet, CSMA/CD (IEEE 802.3), FDDI (ANSI X3T9.5, etc.) would be coupled by an appropriate adapter to the BPFH. Details of the various types of adapters are well known in the prior art and further discussion is not warranted.

Referring again to FIGS. 7 and 2, the BPFH has LANC bus 8 which interconnects it to the LAN Controller/Front End Module a TB/SR bus and ISO (isolation circuitry) which interconnects it to the TB bus 22 and interconnection to the system bus 10. The BPFH includes bridged frame Process Unit 66, receive frame buffer 68, transmit frame buffer 70, system bus interface unit 72 and hardware device driver 74. The system bus interface unit 72 interconnects the BPFH to the system bus. To this end, the system bus interface unit 72 transfers data, commands and interrupts. It performs hand shaking function with other devices on the system bus. It also tracks by the count of data transfer across the system bus. It manages data storage pointers, performs enqueue and dequeuing functions, etc.

The hardware device driver 74 interconnects the BPFH to its respective LAN Controller Front End Module (adapter). To this end, it initializes LANC, gets status counter values, receives frame data from LANC, handles receive frame protocols (interrupts, receive frame status, required frame receiver responds to LAN, etc.). The hardware device driver also transmits frame data to LANC, handles transmit frame protocols (interrupts, transmit frame status, required from transmit response to LANC, retransmit and transmit error, etc.). It also deposits receive frame data from the appropriate LAN into the Receive frame buffer 68, moves transmit frame data from the Transmit frame buffer 70 and forwards to LANC. The hardware device driver74 also interfaces with bridged frame Process Unit 66 to assist in the frame filtering/forwarding decision process. Finally, it interfaces with system bus interface unit 72 and assists in required microprocessor services.

The receive frame buffer 68 is an elastic buffer which receives data frames for subsequent transmission. Similarly, the transmit frame buffer 70 is an elastic buffer which temporarily stores frame for transmission. The receive frame buffer 68 and the transmit frame buffer 70 function to absorb system bus latency.

The bridged frame Process Unit 66 performs a frame routing function on received frames. To this end, it extracts frame control data, frame destination address data, frame source address, routing information field data, process them for frame filtering/forwarding and frame conversion (if required).

Operation

Among the various benefits which the multi-port MAC bridge of the present invention provides is high speed frame routing between LANs. The LAN type may be homogeneous (i.e., token ring to token ring or FDDI to FDDI or ethernet to ethernet, etc.) and/or heterogeneous (i.e., token ring to ethernet, etc.). In addition, the LAN media type may be the same or different (for example, optical fiber, copper twisted shielded pair, copper unshielded twisted pair, etc.). The message protocol can be source routing and/or transparent bridging. The bridge provides efficient frame filtering, copying, forwarding, and header conversion. The named functions are provided in a relatively short time.

In operation, the frames arriving at the Bridge Port Frame Handler are separated into Source Routing Frames and Transparent Bridge Frames. This is done by the Bridged frame process Unit 66 (FIG. 7) examining the R bit in the header section of the frame (FIG. 5). In the preferred embodiment of this invention, if the R bit is set to a 1, the frame is characterized as a Source Routing Frame. Source routing frames are those in which the routing information is provided in the RI field of the header. The receiving Bridge Port Frame Handler examines the routing information in the RI field and determines if the frame is to be forwarded. If it is to be forwarded, the frame is sent to the packet memory and the bus arbiter is notified of the immediate target to which the frame should be routed for processing and/or forwarding. It should be noted that the immediate target would be the microprocessor or another Bridge Port Frame Handler. Access to the system bus is granted by bus arbiter 16.

If the setting of the R bit is a 0, the frame is characterized as a Transparent Bridge Frame and the Destination Address (DA) followed by the Source Address (SA) is transmitted over the transparent bridge (TB) bus 22 (FIG. 1) to the transparent bridge control management (TBCM) unit 26. On arriving at the TBCM 26, the DA address is compared with the contents in the CAM (FIG. 2). If a match is found in the CAM, the signature information in SRAM 1 which relates to the matched address, is extracted and forwarded on the TB bus to the Bridge Port Frame Handler (BPFH) having control of the bus. The BPFH then forwards the received information and header to the BPFH serving the LAN on which the destination station is located. If the SA and DA is on the same LAN, the BPFH invoked the Frame Filtering Function to process (i.e., discard) the frame.

Figure 8:
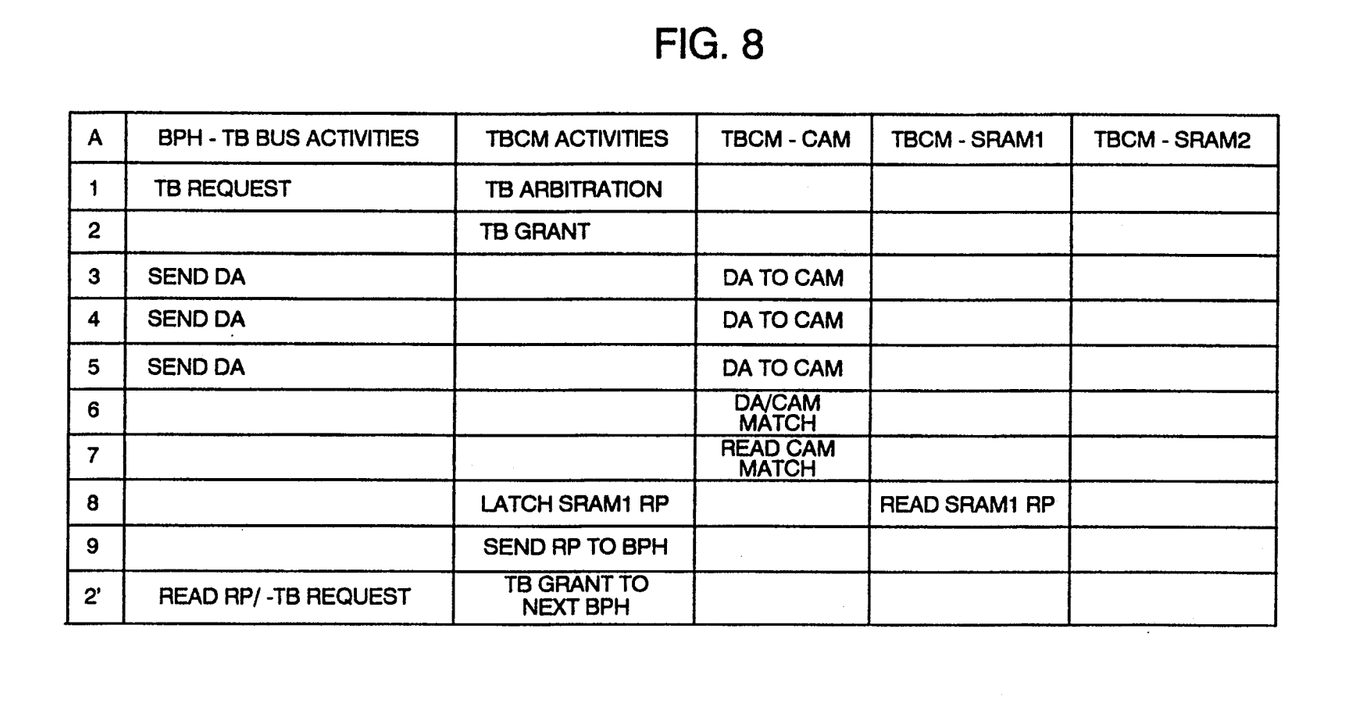
FIG. 8 is an event chart showing and explaining a typical transparent bridging (TB)/destination address (DA) match process.

FIG. 8 is an event chart setting forth details of a typical Transparent Bridging Destination Address (TBDA) matching process. Briefly stated, the DA address which the BPFH sends to the TBCB is compared with the contents in the CAM. If a match occurs, signature information stored in like address in the RAM is extracted and returned to the BPFH. The signature information is used to reroute the related frame. Viewing the chart (FIG. 8) from left to right (columns) and top to bottom (rows), the first column labeled A indicates cycle time. The following columns indicate the various activities being performed between previously named and described components. For example, the second column lists in the first row "BPH-TB bus activities" which mean activities ensuing between the Bridge Port Frame Handler unit and the transparent bus. Similarly, TBCM activities refers to functions performed by the transparent bridge control management unit 26 (FIG. 1) to provide the matching process of the present invention. The other headings are self-explanatory and further description will not be given. The symbol "RP" in this chart represents Routing Parameters. Also, blank under a specific component indicates time slots in which there is no activity of the named component or unit. For example, there is no activity between TBCM and SRAM1 (col. 5) between the first and seventh cycle. Therefore, during this time interval, SRAM1 segments may be used to carry out the aging process previously described.

Still referring to FIG. 8, during the first cycle, col. 1, row 1, bridge port handler unit issues a request to the TB bus arbiter 34 (FIG. 2) for use of the transparent bus. The TB request stays active until the TBCM responds and completes its service to the requestor. Arbitration to use the bus occurs and is indicated at col. 3, row 1 as TB arbitration. The bus is granted during cycle 2 and is identified on the chart at row 2, col. 3 as TB grant. The TB grant stays active throughout the TBCM service. The other activities occurring between the various components are self-explanatory in this chart and further description will not be given.

If no match is found for the DA address in the CAM, then TBCM writes a no-match result which is forwarded to the BPFH unit. The no-match result is prepared by setting appropriate bits in the previously described Table III. In particular, a predetermined default value for the QID1 is set in bits 15-10 (Table III). Bit 9 is set to a logical "1" signifying no DA match found. All other bits in the table are set to logical "0".

Next, the SA is forwarded from the Bridge Port Frame Handler to the TBCM 26. The TBCM compares the SA with the contents of the CAM. If a match occurs, the CSPE time stamps the matched entry (set SRAM1 bit 21=1). If no match occurs, the SPU 58 (FIG. 2) works with CSPE to store the new source addresses (SAs) and their correlated BPFH port ID and its frame format into the SRAM2 for subsequent entry into the CAM/SRAM1.

Figure 9:
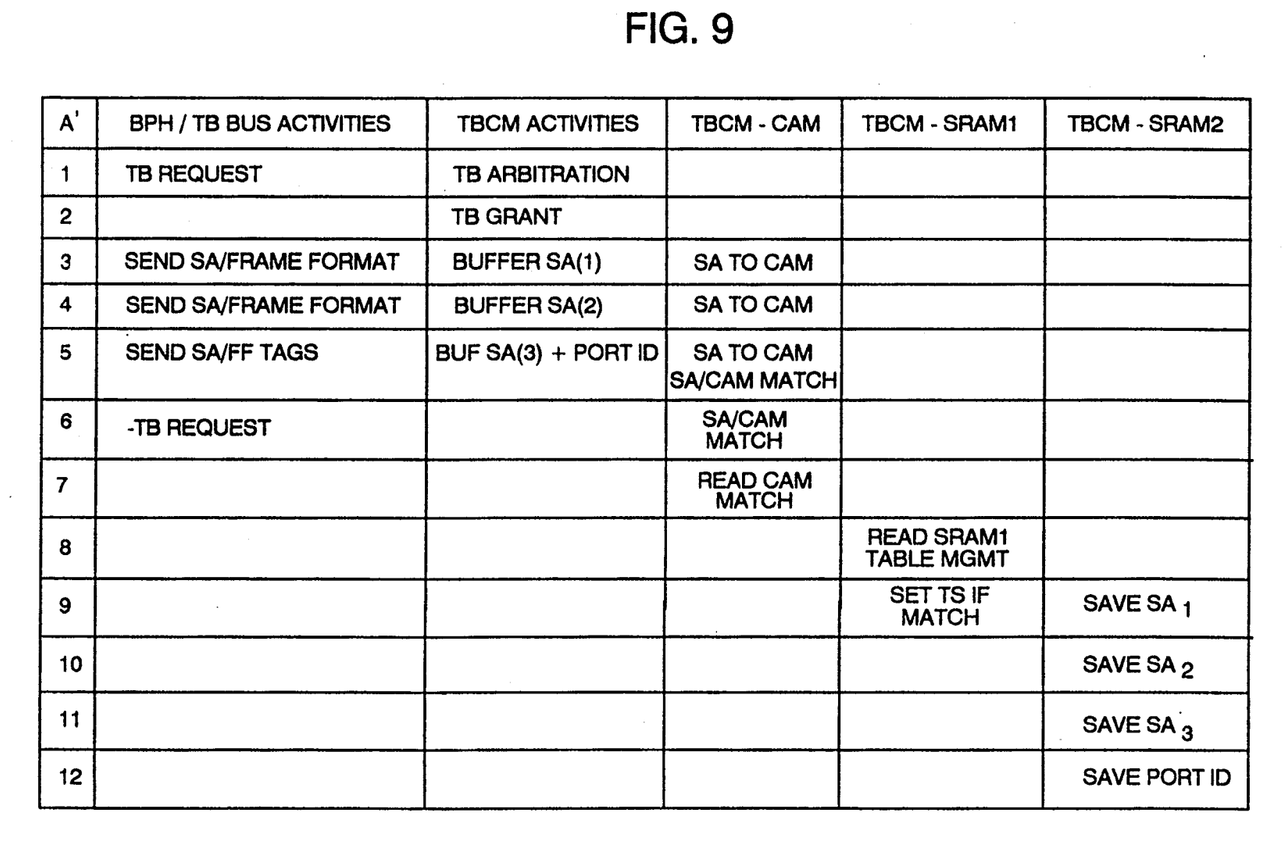
FIG. 9 is an event chart showing and explaining a typical TB/source address (SA) match process.

FIG. 9 is an event chart listing the source address match process. The physical outline or format is substantially the same as FIG. 8. Essentially, the first column A' represents cycle time. The following columns indicate activities or functions done by the units named in the first row.

The source address is used for maintaining the different tables (i.e., SRAM1, SRAM2, etc.) used in this invention.

Still referring to FIG. 9, the first two cycles (Column A) relates to the request and grant of the transparent bus (TB). As previously described, the bridge port frame handler (BPFH) requests the bus which is granted by the TB bus arbiter 34 (FIG. 2). The BPFH uses three cycles (3, 4 and 5) to send the source address (SA), frame format and tags to the TBCM. The received information is stored in the TBCM. The SA is compared with the contents of the CAM (cycle 6). If a match occurs, the location or address of the match is read out (cycle 7) and is used to access or read SRAM1 (cycle 8). In particular, the TABLE MGMT field of SRAM1 (FIG. 3B) is of interest. The stored port ID is compared with the incoming port ID and the TS bit is set if the port IDs match (cycle 9). In addition, the SA, port ID, etc., are stored (cycle 8 through 12). It should be noted that while the TBCM is performing internal processing of SA matching, etc., another BPFH could raise a request (cycle 6) for use of the TB bus. The blank spaces in the table of FIG. 9 indicate that TB grant data transfers, etc., could be done simultaneously with the internal processing. The simultaneous operation further reduces the time required to route information through the multiport bridge. Finally, it should be noted that conventional timing diagrams instead of the event charts, FIGS. 8 and 9, could be used to explain BPFH, TB Bus, TBCM, SRAM1, SRAM2, CAM, etc., activities.

While the invention has been particularly shown and described with reference to a preferred embodiment thereof, it will be understood by those skilled in the art that various changes in form and details may be made therein without departing from the spirit and scope of the invention.

Having thus described our invention, what we claim and desire to secure by Letters Patent is:

1. An apparatus for interconnecting communications networks comprising:
   a first bus means for transporting information;
   a second bus means for transporting information;
   at least one bridge port frame handler means coupled to the first bus means and the second bus means; said at least one bridge port frame handler means receiving frames from or transmitting frames onto at least one of the communications networks;
   a first means for storing data provided by the at least one bridgeport frame handler means coupled to the first bus means;
   a first bus arbiter coupled to the first bus means, said first bus arbiter being responsive to requests to grant access to said first bus means;
   a transparent bridge routing (TBR) means for processing transparent bridge frames coupled to the second bus means; and
   a first controller means, coupled to the transparent bridge routing means and the first bus means, said first controller means controlling the transparent bridge routing means and selected ones of components directly connected to the first bus means.

2. The apparatus of claim 1 further including at least one LAN controller interconnecting the at least one bridge port frame handler to at least one communications network.

3. The apparatus of claim 1 further including a first circuit means disposed between the controller means and the transparent bridge routing means; said first circuit means being responsive to control signals provided by said first controller means to electrically isolate said controller means from the transparent bridge routing means.

4. The apparatus of claim 3 further including a second circuit means connecting the at least one bridge port handler means to the second bus means; said second circuit means being responsive to control signals provided by said transparent bridge routing means to electrically isolate said at least one bridge port handler from the second bus means.

5. The apparatus of claim 1 wherein the transparent bridge routing means includes a first buffer means for storing destination address/source address;
   a second bus arbiter for allowing said at least one port handler means to access the second bus means;
   a central data bank means for storing station addresses and associated signature information including bridge port handler addresses, communication network types, network protocol information and control information; and
   a second control means responsive to data in the first buffer and control signals generated by the second bus arbiter to correlate the addresses in the central data bank means with an address in the first buffer and upon a matched address, extracting from said central data bank means signature information associated with the matched address and for writing said signature information to the at least one bridge port handler means.

6. The apparatus of claim 5 further including an auxiliary data bank means coupled to the second control means and the first buffer means; said auxiliary data bank means responsive to control signals generated by the second control means to move an address from the first buffer means into the auxiliary data bank means when the address in said first buffer means does not match an entry in the central data bank means.

7. The apparatus of claim 6 further including an aging facility means interconnecting the first controller means and the central data bank means, said aging facility means responsive to control signals outputted from the first control means to update and/or delete selected information from the central data bank means.

8. The apparatus of claim 6 wherein the auxiliary data bank means include a second SRAM for storing station addresses not found in the central data bank means; and
a third controller coupled to the second SRAM.

9. The apparatus of claim 5 further including an update buffer means for storing information to update the central bank means coupled to the first control means and the second control means; said second control means responsive to control signals outputted from the first control means to transfer the information from the update buffer means to the central data bank means.

10. The apparatus of claim 5 wherein the central data bank means include a CAM for storing station addresses; and
a first SRAM for storing signature information on LAN stations.

11. The apparatus of claim 1 further including at least one adapter coupling the at least one bridge port handler means to at least one communications network.

12. The apparatus of claim 11 wherein the transparent bridge routing means includes a first buffer means for storing destination address/source address data;
a second bus arbiter for allowing said at least one port handler means to access the second bus means;
a central data bank means for storing information including station addresses, bridge port handler addresses, communications network types, network protocol information and control information;
a second control means responsive to data in the first buffer means and control signals generated by the second bus arbiter to correlate the addresses in the central data bank means with an address in the first buffer means and upon a matched address, extracting from said central data bank means signature information associated with the matched address and for writing said signature information to the at least one bridge port handler means.

13. The apparatus of claim 11 wherein the at least one adapter includes a Token Ring adapter, an ethernet adapter or FDDI adapter.

14. The apparatus of claim 11 wherein the at least one bridge port frame handler means includes a Bridged frame process unit for interfacing with the second bus means;
a hardware device driver for interfacing with a LAN;
a system interface unit for interfacing with the first bus means;
a Receive frame buffer coupled to the bridged frame process unit and the hardware driver; and
a Transmit frame buffer coupled to the bridged Frame Process Unit and the hardware driver.

15. The apparatus of claim 1 wherein the at least one bridge port handler means includes a Bridged frame process unit for interfacing with the second bus means;
a hardware device driver for interfacing with a LAN;
a system interface unit for interfacing with the first bus means;
a Receive frame buffer coupled to the bridged frame process unit and the hardware driver; and
a Transmit frame buffer coupled to the bridged frame process unit and the hardware driver.

16. An improved multi-port bridge for interconnecting local area networks LANs including:
a first transmission bus means for transmitting information;
at least one Bridge Port Frame Handler means coupled to said first transmission bus means; said Bridge Port Frame Handler means receiving a frame from a LAN and extracting a destination address DA and/or a source address SA from said frame;
a Contents Address Memory CAM for storing addresses of stations connected to the LANs;
a first SRAM for storing signature information coupled to the CAM;
a transparent bridge control means coupled to said first transmission bus means and to said CAM for receiving DA and/or SA from said at least one Bridge Port Frame Handler means correlating the DA with the addresses in the CAM and upon a match, extracting associated signature information from the SRAM and forwarding the signature information to said at least one bridge port frame handler means.

17. The improved multiport bridge of claim 16 wherein the transparent bridge control means further correlates SA received from the Bridge Port Frame Handler means with address entries in the CAM and upon a match updates selected fields in a selected entry of the SRAM.

18. The improved multiport bridge of claim 16 further including:
a SRAM controller coupled to the transparent bridge control means; and
a second SRAM for storing source address SA not found in the contents address memory CAM coupled to the SRAM controller.

19. The improved multiport bridge of claim 16 wherein the SA is correlated with the station addresses stored in the CAM, if a SA match is not found, the transparent bridge control means notifies the SRAM controller which transfers unmatched SA to the second SRAM.

20. The improved multiport bridge of claim 19 further including a microprocessor coupled to the transparent bridge control means and the first transmission bus means; said microprocessor responsive to signals from the transparent bridge control means to transfer addresses from the second SRAM into the CAM.

21. The improved multi-port bridge of claim 16 further including a means for processing Source Routing Frames coupled to the at least one Bridge Port Frame Handler; and a microcontroller coupling the means for processing Source Routing Frames to the transparent bridge control means.

22. The improved multi-port bridge of claim 21 wherein the means for processing Source Routing Frames includes a second transmission bus means for transporting information;

a bus arbiter coupled to the second transmission bus means; and a packet memory coupled to the second transmission bus means.

* * * * *